US012688944B2

(12) United States Patent
Jo et al.

(10) Patent No.: US 12,688,944 B2
(45) Date of Patent: Jul. 21, 2026

(54) METHOD FOR PREPARING $UO_2$ MIXTURE POWDER FOR NUCLEAR FUEL MANUFACTURING BY MEANS OF IBC BLENDER, AND $UO_2$ MIXTURE POWDER FOR NUCLEAR FUEL MANUFACTURING, PREPARED THEREBY

(71) Applicant: KEPCO NUCLEAR FUEL CO., LTD., Daejeon (KR)

(72) Inventors: Bohyun Jo, Daejeon (KR); Hui Sung Choi, Sejong (KR); Dong Hyun Cho, Daejeon (KR); Ji Hwan Son, Daejeon (KR); Junseok Park, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 282 days.

(21) Appl. No.: 18/561,045

(22) PCT Filed: Aug. 20, 2021

(86) PCT No.: PCT/KR2021/011124
§ 371 (c)(1),
(2) Date: Nov. 15, 2023

(87) PCT Pub. No.: WO2022/260212
PCT Pub. Date: Dec. 15, 2022

(65) Prior Publication Data

US 2024/0257989 A1 Aug. 1, 2024

(30) Foreign Application Priority Data

Jun. 10, 2021 (KR) ........................ 10-2021-0075397

(51) Int. Cl.
*G21C 3/62* (2006.01)
*G21C 3/04* (2006.01)
*G21C 21/00* (2006.01)

(52) U.S. Cl.
CPC ............. *G21C 3/623* (2013.01); *G21C 3/045* (2019.01); *G21C 21/00* (2013.01)

(58) Field of Classification Search
CPC ........ G21C 3/623; G21C 3/045; G21C 21/00; B22F 10/00; B22F 12/00; B22F 3/00; B29C 64/153; B29C 43/006
See application file for complete search history.

(56) References Cited

U.S. PATENT DOCUMENTS 5,841,200 A * 11/1998 Bauer ..................... C04B 35/51
252/640
6,517,230 B1 * 2/2003 Afnan ..................... B01F 31/23
366/208

(Continued)

FOREIGN PATENT DOCUMENTS

CN 103831990 A 6/2014
EP 2386351 B1 9/2014

(Continued)

OTHER PUBLICATIONS

Asakura et al., Developments in the fabrication technology of low density MOX pellets for fast breeder reactor fuel, Journal of Nuclear Materials, vol. 357, Issue 1-3, p. 126-137, Oct. 15, 2006.*

(Continued)

*Primary Examiner* — Yung-Shem M Tsui
(74) *Attorney, Agent, or Firm* — You & IP, LLC

(57) ABSTRACT

A method for preparing a $UO_2$ mixture powder for nuclear fuel manufacturing, comprises the steps of: (a) weighing and sieving, by means of an automatic injection device, a $UO_2$ powder, a porogen and a lubricant, and injecting same into a UC container; and (b) mixing the $UO_2$ powder, the porogen and the lubricant by means of an IBC blender. According to a method for preparing a $UO_2$ mixture powder for nuclear fuel manufacturing, mixing time is short, and degrees of (Continued)

mixing and homogeneity of a prepared $UO_2$ mixture powder are excellent.

5 Claims, 4 Drawing Sheets

(56) References Cited

U.S. PATENT DOCUMENTS

| | | | |
|---|---|---|---|
| 2012/0228788 | A1 | 9/2012 | Jankowiak et al. |
| 2012/0287747 | A1 | 11/2012 | Lee |
| 2019/0358599 | A1 | 11/2019 | Piepereit |

FOREIGN PATENT DOCUMENTS

| | | | | | |
|---|---|---|---|---|---|
| JP | 59173123 | A | | 10/1984 | |
| JP | 1133379 | A | | 2/1999 | |
| JP | 2013-504049 | A | | 2/2013 | |
| JP | 2020-514049 | A | | 5/2020 | |
| KR | 10-2003-0080920 | A | | 10/2003 | |
| KR | 10-2004-0029408 | A | | 4/2004 | |
| KR | 10-1001202 | B1 | | 12/2010 | |
| KR | 10-2012-0068407 | A | | 6/2012 | |
| KR | 101407633 | B1 | * | 6/2014 | ............ G21C 3/623 |
| WO | 2018115893 | A1 | | 6/2018 | |

OTHER PUBLICATIONS

Saintyco, IBC Blending System, https://www.saintyco.com/category/pharma-equipment/saintyco-solids-production/saintyco-ibc-blending-system/, Sep. 21, 2020.*

K. Asakura et al., "Developments in the fabrication technology of low density MOX pellets for fast breeder reactor fuel", Journal of Nuclear Materials, 2006, pp. 126-137, vol. 357.

MultiBlend Blenders, Pharmatech, Innovation in Pharmaceutical Engineering,.

* cited by examiner

METHOD FOR PREPARING $UO_2$ MIXTURE POWDER FOR NUCLEAR FUEL MANUFACTURING BY MEANS OF IBC BLENDER, AND $UO_2$ MIXTURE POWDER FOR NUCLEAR FUEL MANUFACTURING, PREPARED THEREBY

TECHNICAL FIELD

The present disclosure relates to a method of preparing $UO_2$ powder mixture for nuclear fuel manufacturing using an IBC blender and a $UO_2$ powder mixture for nuclear fuel manufacturing prepared thereby.

BACKGROUND ART

Typically, uranium dioxide ($UO_2$) pellets are widely used as nuclear fuel used in nuclear power plants.

$UO_2$ pellets, used as nuclear fuel, are manufactured from $UO_2$ powder. More specifically, $UO_2$ pellets are manufactured through the following steps: preparing a $UO_2$ powder mixture by mixing $UO_2$ powder with additives, such as porogens and lubricants; manufacturing a $UO_2$ molded pellet by pressing the prepared $UO_2$ powder mixture; manufacturing a $UO_2$ sintered pellet by sintering the manufactured $UO_2$ molded pellet; and manufacturing a $UO_2$ ground pellet by grinding the sintered pellet so that the sintered pellet maintains a uniform diameter.

In the preparation step of the $UO_2$ powder mixture, a porogen and a lubricant are typically added and mixed using a mixing device to improve the fluidity of the powder and the properties of the finally manufactured pellets. The degrees of mixing and homogeneity resulting from mixing greatly affect the properties and quality of the finally manufactured pellets. For this reason, the performance of the mixing device with which the powder is mixed is significantly important in the preparation step of the $UO_2$ powder mixture.

In existing methods of preparing a $UO_2$ powder mixture for nuclear 0 fuel manufacturing, a screw mixer is typically used. As shown in FIG. 1, an operator manually weighs and sieves additives to inject the weighed and sieved additives into a UC container 1, equips a Fit-Up device 2 located at the top of the screw mixer with the UC container, mixes the additives using the screw mixer 3, and then stores the resulting powder mixture in a separate container 4.

The existing method of preparing the $UO_2$ powder mixture for nuclear fuel manufacturing requires about 4 hours of mixing time, which is time-consuming because the lubricant is required to be added several times in the mixing process to ensure homogeneous distribution of the lubricant. In addition, work continuity is poor, and workers need to be on standby to add the lubricant. Furthermore, due to the nature of the nuclear fuel manufacturing method that handles nuclear materials, several problems in terms of economic feasibility, efficiency, and safety occur.

DOCUMENT OF RELATED ART

Korean Patent Application Publication No. 10-2004-0029408 (2004.04.06)

Korean Patent No. 10-1001202 (2010.12.15)

DISCLOSURE

Technical Problem

The present disclosure aims to provide a method of preparing a $UO_2$ powder mixture for nuclear fuel manufacturing, in which mixing takes a short time, and the degrees of mixing and homogeneity of a prepared $UO_2$ powder mixture are excellent.

Technical Solution

The present disclosure provides a method of preparing a $UO_2$ powder mixture for nuclear fuel manufacturing, which includes (a) weighing and sieving a porogen and a lubricant using an automatic injection device and injecting the weighed and sieved porogen and lubricant into a UC container containing $UO_2$ powder, and (b) mixing the $UO_2$ powder, the porogen, and the lubricant using an IBC Blender.

The porogen may be $U_3O_8$ powder or azodicarbonamide (ADCA, $C_2H_4N_4O_2$).

The lubricant may be Acrawax (ethylene distearamide, $C_{38}H_{76}N_2O_2$) or zinc stearate (Zn—$C_{36}H_{70}O_4$).

The $UO_2$ powder may be contained in an amount of 10 to 500 kg. In addition, 0.08 to 10 parts by weight of the porogen and 0.05 to 1 part by weight of the lubricant may be contained with respect to 100 parts by weight of the $UO_2$ powder.

The automatic injection device may include a 300-μm sieving machine and remove granules present in the porogen and the lubricant. In addition, the porogen and the lubricant may be added to the automatic injection device in a weight ratio set according to the weight of the $UO_2$ powder.

In the (b) mixing, forward mixing may be performed under conditions in which a rotation speed is in a range of 10 to 14 rpm, a container filling rate of the powder is in a range of 50 to 70 vol %, and a mixing time is in a range of 20 to 30 minutes.

The (b) mixing may further include performing backward mixing for 10 minutes.

In addition, the present disclosure may provide a $UO_2$ powder mixture for nuclear fuel manufacturing, the powder mixture prepared by the method of preparing the $UO_2$ powder mixture for nuclear fuel manufacturing.

Furthermore, the present disclosure may provide a method of manufacturing $UO_2$ nuclear fuel, which includes: manufacturing a $UO_2$ molded pellet by pressing the $UO_2$ powder mixture for nuclear fuel manufacturing; manufacturing a $UO_2$ sintered pellet by sintering the $UO_2$ molded pellet; and manufacturing a $UO_2$ ground pellet by grinding the sintered pellet so that the sintered pellet maintains a uniform diameter, in which a defect rate is 5% or less, and the sintered pellet has a density of 10.30 to 10.58 g/cm$^3$.

Advantageous Effects

According to a method of preparing a $UO_2$ powder mixture for nuclear fuel manufacturing of the present disclosure, mixing takes a short time, and the degrees of mixing and homogeneity of a prepared $UO_2$ powder mixture are excellent.

When using the $UO_2$ powder mixture for nuclear fuel manufacturing, prepared according to the method of preparing the $UO_2$ powder mixture for nuclear fuel manufacturing of the present disclosure, a finally manufactured $UO_2$ pellet has excellent properties and quality.

BEST MODE

Hereinafter, the present disclosure will be described in more detail through embodiments, examples, and drawings. These embodiments and examples are disclosed only for illustrating the present disclosure, and it will be apparent to those skilled in the art that the scope of the present disclosure is not to be construed as limited by these embodiments and examples.

According to one embodiment, the present disclosure provides a method of preparing a $UO_2$ powder mixture for nuclear fuel manufacturing, which includes (a) weighing and sieving a porogen and a lubricant using an automatic injection device and injecting the weighed and sieved porogen and lubricant into a UC container containing $UO_2$ powder, and (b) mixing the $UO_2$ powder, the porogen, and the lubricant using an IBC Blender.

The $UO_2$ powder is a starting material for preparing the $UO_2$ powder mixture for nuclear fuel manufacturing and manufacturing nuclear fuel pellets. In one embodiment of the present disclosure, the $UO_2$ powder has a specific surface area of 2.6 to 2.7 $m^2/g$ and an average particle size of 4.0 to 10 μm. In one embodiment of the present disclosure, the $UO_2$ powder may be used in an amount of 10 to 500 kg.

When manufacturing a molded pellet using the $UO_2$ powder mixture and sintering the molded pellet to manufacture a sintered pellet, the porogen is an agent that enables the sintering density of the sintered pellet to be controlled and the size of pores inside the sintered pellet to be adjusted. As the porogen, $U_3O_8$ powder or azodicarbonamide (ADCA, $C_2H_4N_4O_2$) may be used. The porogen may be contained in an amount of 0.08 to 10 parts by weight with respect to 100 parts by weight of the $UO_2$ powder.

The lubricant, an agent added to form a thin film on $UO_2$ powder particles, improves the fluidity of the powder particles not only to regulate the amount charged into a die during powder molding but also to increase the production speed of the molded pellet. In addition, during the powder molding, the pressure between the powder particles and the frictional pressure between the powder particles and die walls may be reduced to achieve a desired molding density at the optimal molding pressure, which has the effect of extending the life cycle of die and punch. Acrawax (ethylene distearamide, $C_{38}H_{76}N_2O_2$) or zinc stearate (Zn—$C_{36}H_{70}O_4$) may be used as the lubricant. The lubricant may be contained in an amount of 0.05 to 1 part by weight with respect to 100 parts by weight of the $UO_2$ powder.

The intermediate bulk container blender (IBC blender) refers to a blender that mixes the contents by rotating the container itself in various directions.

Figure 5:
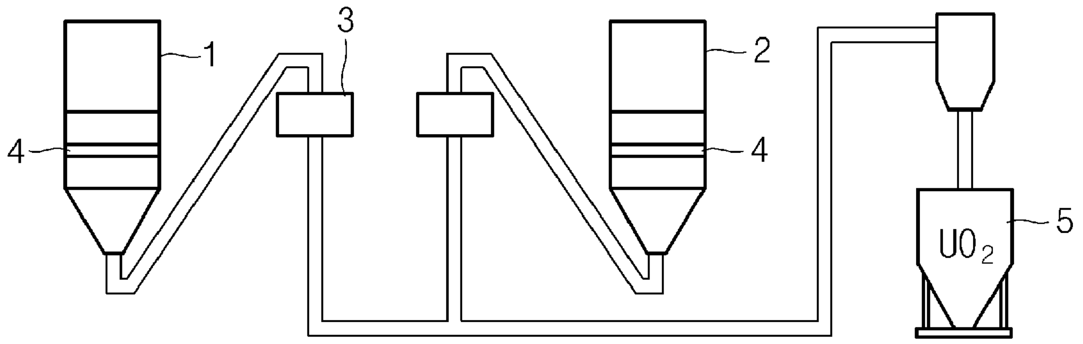
FIG. 5 is a diagram illustrating the configuration of an automatic additive injection device that automatically injects additives into a UC container containing a $UO_2$ powder, in which powder mixing is performed while an IBC blender is equipped with the UC container of FIG. 2.

The automatic injection device is a device that weighs and sieves the porogen and the lubricant and injects the weighed and sieved porogen and lubricant into the UC container containing the $UO_2$ powder. The automatic injection device may include a 300-μm sieving machine and remove granules present in the porogen and the lubricant. The automatic injection machine is illustrated in FIG. 5. As illustrated in FIG. 5, the automatic injection device includes a first additive injection device 1, a second additive injection device 2, and an additive weighing device 3. In addition, the respective additive injection devices include the 300-μm sieving machine 4. The UC container refers to a standard container (Uranium-C(standard order) container) having a capacity of 700 liters, certified by the Korea Institute of Nuclear Safety, which is capable of handling uranium powder with a maximum enrichment of 5.0 w/o. The 300-μm sieving machine 4 is a sieving machine capable of removing substances, such as particles and granules having a size exceeding 300 μm.

In the (b) mixing, forward mixing may be performed under conditions in which a rotation speed is in a range of 10 to 14 rpm, a container filling rate of the powder is in a range of 50 to 70 vol %, and a mixing time is in a range of 20 to 30 minutes. The (b) mixing may further include performing backward mixing for 10 minutes.

One embodiment of the present disclosure may provide a method of manufacturing a $UO_2$ nuclear fuel, which includes: manufacturing a $UO_2$ molded pellet by pressing the $UO_2$ powder mixture for nuclear fuel manufacturing; manufacturing a $UO_2$ sintered pellet by sintering the $UO_2$ molded pellet; and manufacturing a $UO_2$ ground pellet by grinding the sintered pellet so that the sintered pellet maintains a uniform diameter, in which a defect rate is 5% or less, and the sintered pellet has a density of 10.30 to 10.58 $g/cm^3$.

The "defect rate" used herein means the number of defective pellets generated in each step among all the pellets manufactured through the molding, sintering, and grinding processes using the $UO_2$ powder mixture. The pellet that does not meet the design conditions or specifications is determined as being defective.

Example 1

To further improve the degrees of mixing and homogeneity of a $UO_2$ powder mixture for nuclear fuel manufacturing, research was conducted by performing a mixing method using an IBC blender with varying conditions.

For the research, a predetermined amount of $U_3O_8$ powder (in this case, 5 parts by weight with respect to 100 parts by weight of $UO_2$ powder) prepared by oxidizing pellet scraps generated in a $UO_2$ pellet manufacturing process was added to $UO_2$ powder and then mixed. When adding and mixing the $U_3O_8$ powder, the scraps are not only able to be recycled, thereby improving economic feasibility, but also act as a porogen, thereby controlling the density of the $UO_2$ pellets as well as the size and number of pores present inside the pellets depending on the amount added. In addition, to improve the formability of the pellets and the fluidity of the powder affecting the quality of the pellets, a predetermined amount of a lubricant (in this case, 0.4 parts by weight with respect to 100 parts by weight of the $UO_2$ powder and $U_3O_8$ powder; 0.38 parts by weight with respect to 100 parts by weight of $UO_2$ powder) was added and then mixed. Zn-stearate (Zn—$C_{36}H_{70}O_4$) powder was used as the lubricant. The Zn content was 10% in the Zn-stearate. In addition, the Zn content in the ($UO_2$+$U_3O_8$) powder was measured to be about 20 ppm. Therefore, when adding 0.4 parts by weight of the Zn-stearate to the ($UO_2$+$U_3O_8$) powder with respect to 100 parts by weight of the $UO_2$ powder and $U_3O_8$ powder, the Zn content in the powder mixture is theoretically 420 ppm.

To verify the mixing performance of the IBC blender, the mixing time, mixing direction (forward and backward), container filling rate, and rotation speed of the IBC blender were set as the variables of the performance conditions. The container filling rate is expressed as vol % of the powder volume with respect to the total container volume. The content analysis and deviation measurement of the Zn contained in the powder mixture were performed. To this end, a single powder mixture was prepared for each performance condition, and 5 samples were collected from each powder mixture to measure the Zn content and deviation. The Zn content was measured by an inductively coupled plasma-optical emission spectroscopy (ICP-OES). The degree of mixing was evaluated by comparing the measured Zn content and the theoretical Zn content, and the degree of homogeneity was evaluated through the deviation of the measured Zn content.

The degree of mixing refers to the degree to which the additives are mixed. The better the mixing, the closer the measured degree of mixing is to the theoretical Zn content. The lower the degree of mixing, the more the unmixed additives.

The degree of homogeneity refers to how evenly the additives present in the powder mixture are mixed. In this specification, the degree of homogeneity was evaluated through the deviation of the measured Zn content, indicating the lower the deviation, the better the degree of homogeneity.

Table 1 below shows the Zn content and deviation in the $UO_2$ powder mixture depending on each performance condition.

the mixing time exceeded 30 minutes and increased to 60 minutes, the average Zn content shifted far away from the theoretical value, indicating that the deviation also increased. This is because the excessively increased mixing time leads to the segregation of some of the added substances.

On the other hand, as a result of further performing backward rotation for 10 minutes after forward rotation, the measurement values were much closer to the theoretical value than those when performing only the forward mixing, not to mention that the deviations were found to be smaller. This is because when performing rotation in one direction for a predetermined time and then performing rotation in the opposite direction, there are fewer unmixed added substances. On the other hand, such results were almost similar regardless of the filling rate. However, a filling rate of 50% is superior in degree of homogeneity to a filling rate of 70%, so the filling rate is preferably set to 50%.

Figure 4:
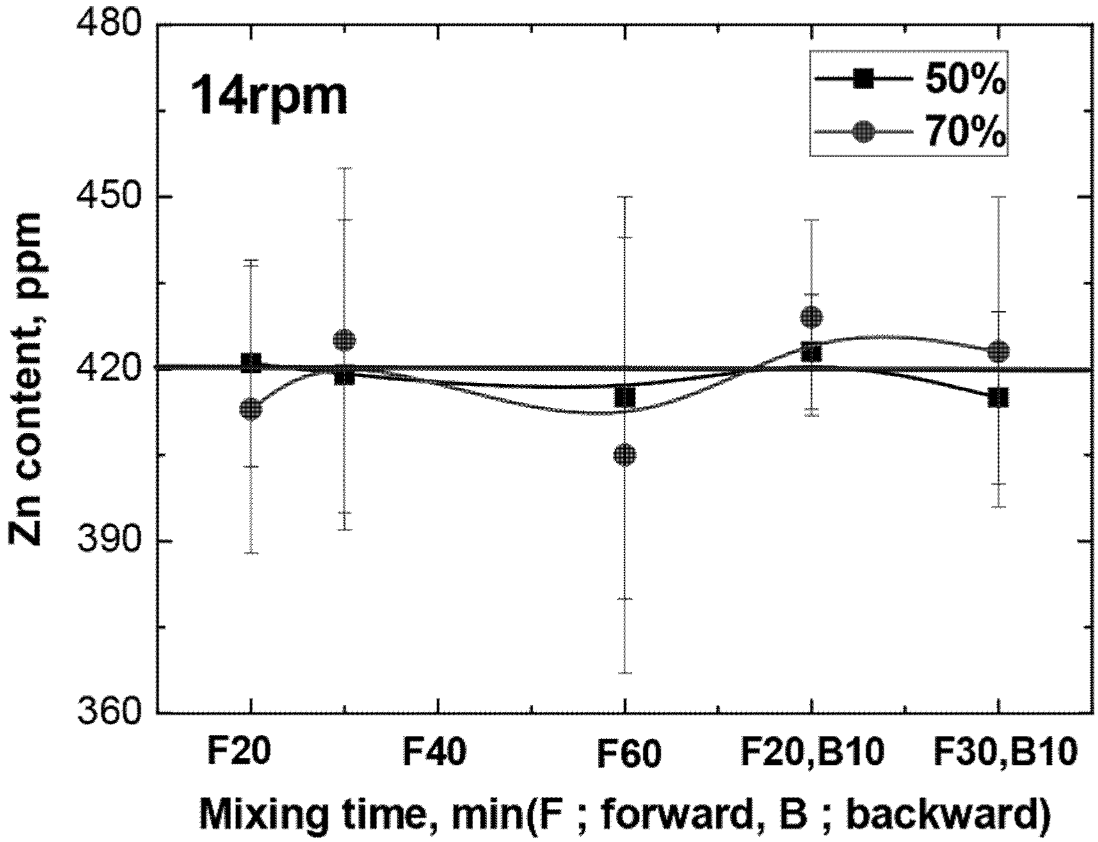
FIG. 4 is a diagram showing Zn content and deviation in a $UO_2$ powder mixture with varying mixing conditions of an IBC blender at a rotation speed of 14 rpm.

FIG. 4 shows the performance results in the IBC blender at a rotation speed of 14 rpm. As shown in FIG. 4, in the case of performing only the forward mixing in the IBC blender at a rotation speed of 14 rpm, the average Zn contents of the samples each independently mixed for 20 and 30 minutes were measured to be 421 rpm and 419 rpm, respectively, which were close to the theoretical value (420 ppm), not to mention that the deviation was small. However, the average Zn content was closer to the theoretical value, and the deviation was smaller at a mixing time of 30 minutes rather than at a mixing time of 20 minutes. On the other hand, when the mixing time exceeded 30 minutes and increased to 60 minutes, the average Zn content shifted far away from the theoretical value, indicating that the deviation also increased. This is because the excessively increased mixing time leads to the segregation of some of the added substances.

TABLE 1

| | | Zn CONTENT (ppm); ( )VALUE:DEVIATION DIRECTION | | | | |
|---|---|---|---|---|---|---|
| | | Forward | | | Forward/Backward | |
| ROTATION | FILLING | TIME (MIN) | | | | |
| SPEED (rpm) | RATE (vol %) | 20 | 30 | 60 | FORWARD20/ BACKWARD10 | FORWARD30/ BACKWARD10 |
| 10 | 50 | 416(20) | 422(15) | 400(40) | 423(15) | 420(20) |
| | 70 | 408(22) | 430(29) | 410(42) | 418(21) | 415(23) |
| 14 | 50 | 421(18) | 419(27) | 415(35) | 423(10) | 415(15) |
| | 70 | 413(25) | 425(30) | 405(38) | 429(17) | 423(27) |

The forward and backward rotation mean relatively opposite directions to each other. The forward may mean a clockwise or counterclockwise direction, and the backward may mean a counterclockwise or clockwise direction, which is opposite to the forward direction.

Figure 1:
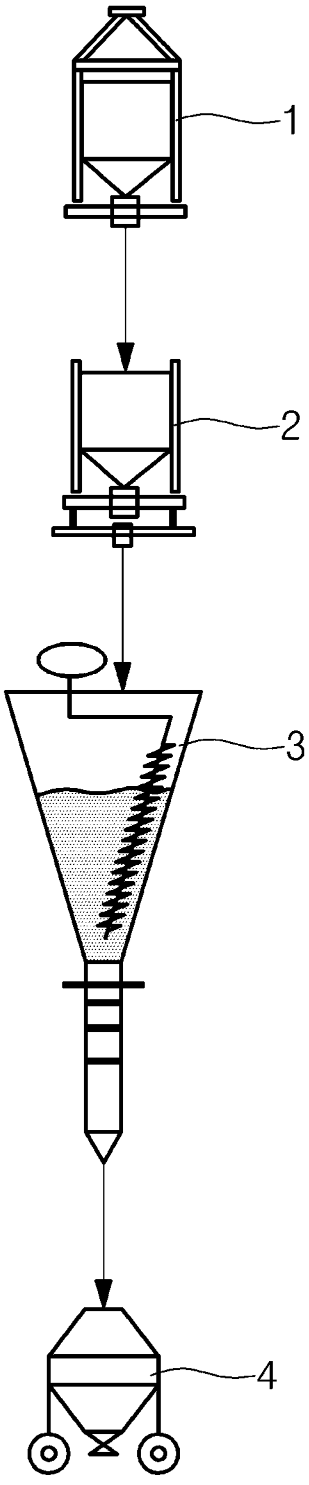
FIG. 1 is a diagram illustrating a method of mixing a $UO_2$ powder using a currently available screw mixer.
Figure 2:
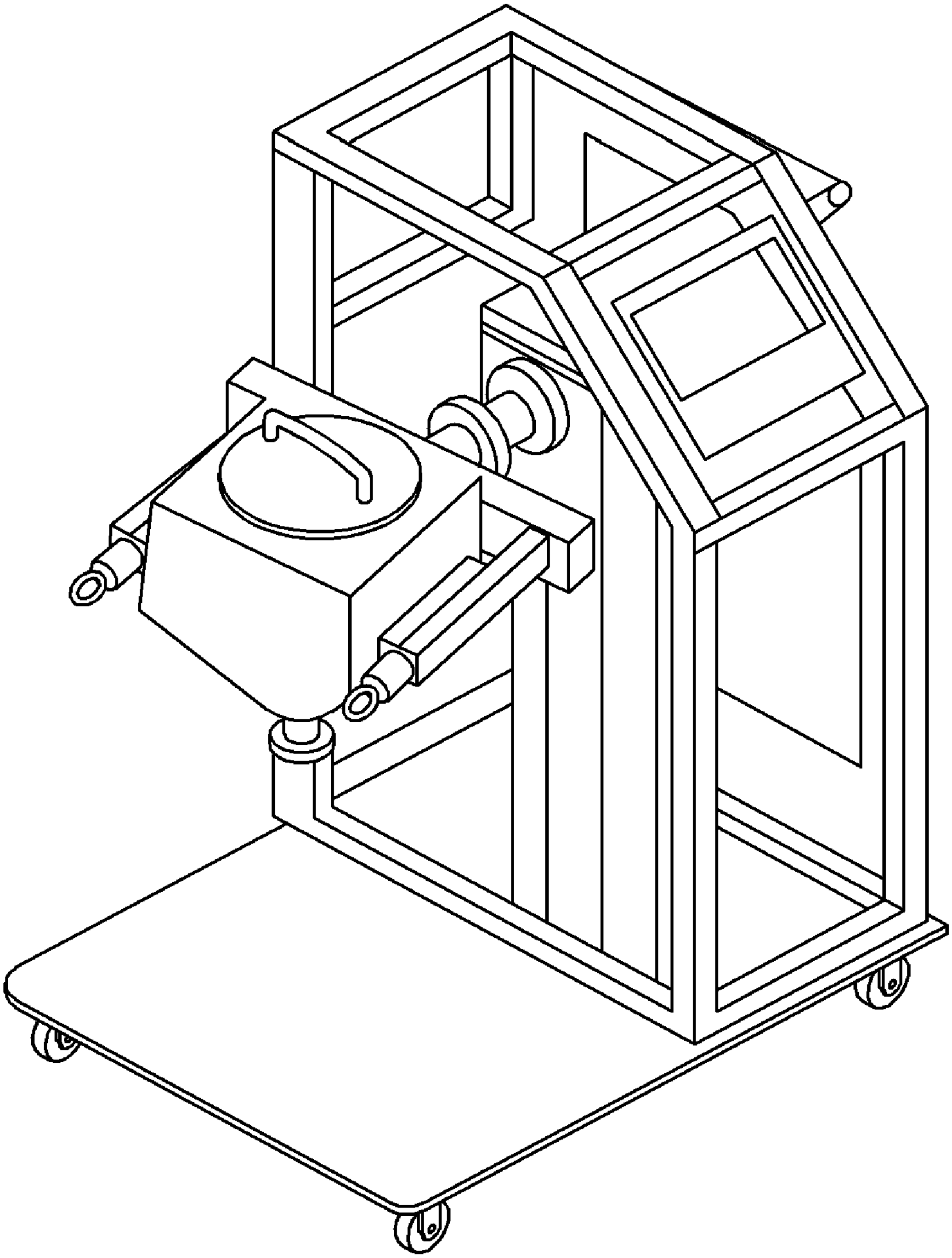
FIG. 2 is a diagram illustrating the configuration of an IBC blender used in the present disclosure.
Figure 3:
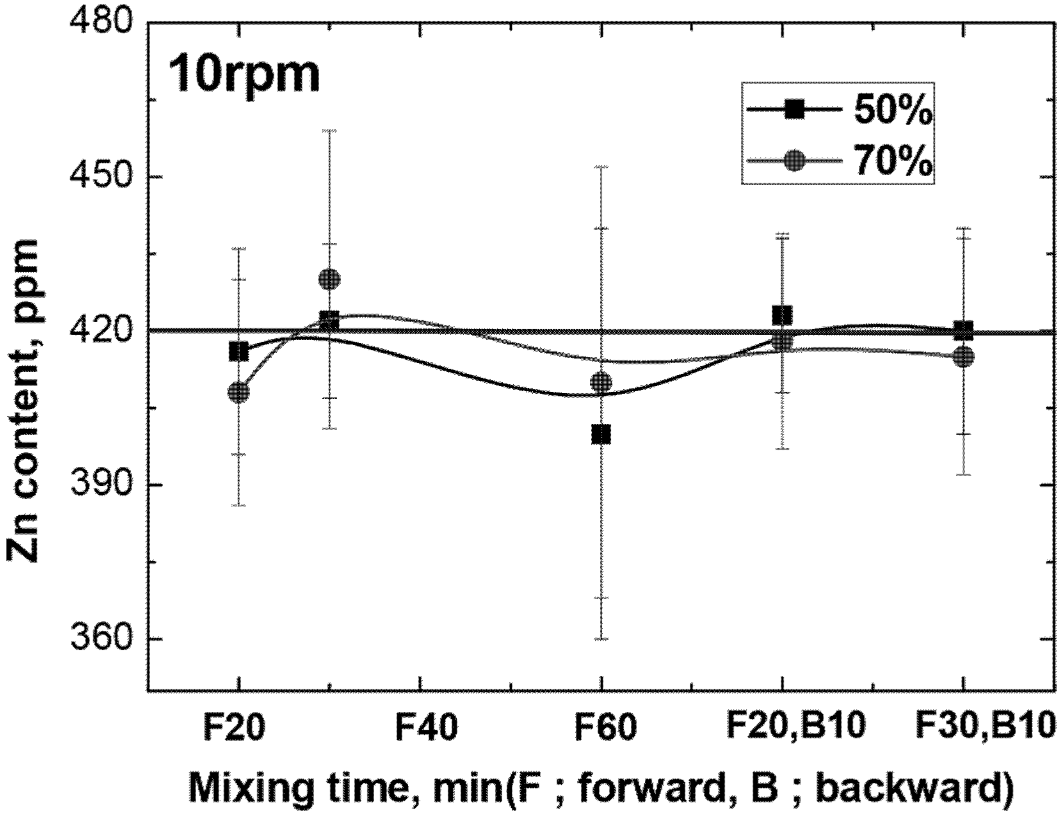
FIG. 3 is a diagram showing Zn content and deviation in a $UO_2$ powder mixture with varying mixing conditions of an IBC blender at a rotation speed of 10 rpm.

FIGS. 3 and 4 each independently show the results of Table 1 above depending on the rotation speed.

FIG. 3 shows the performance results at an IBC blender rotation speed of 10 rpm. As shown in FIG. 3, in the case of performing only the forward mixing in the IBC blender at a rotation speed of 10 rpm, the average Zn contents of the samples each independently mixed for 20 and 30 minutes were measured to be 416 rpm and 422 rpm, respectively, which were close to the theoretical value (420 ppm), indicating that the deviations were small. However, the average Zn content was closer to the theoretical value, and the deviation was smaller at a mixing time of 30 minutes rather than at a mixing time of 20 minutes. On the other hand, when On the other hand, as a result of further performing backward rotation for 10 minutes after forward rotation, the measurement values were closer to the theoretical value than those when performing only the forward mixing, not to mention that the deviations were found to be smaller. This is because when performing rotation in one direction for a predetermined time and then performing rotation in the opposite direction, there are fewer unmixed added substances. On the other hand, such results were almost similar regardless of the filling rate. However, a filling rate of 50% is superior in degree of homogeneity to a filling rate of 70%, so the filling rate is preferably set to 50%.

Example 2

The properties of $UO_2$ pellets manufactured from $UO_2$ powder mixtures prepared by an existing method of preparing a $UO_2$ powder mixture for nuclear fuel manufacturing and a method of preparing a $UO_2$ powder mixture for nuclear fuel manufacturing of the present disclosure are compared.

Among the process of manufacturing $UO_2$ pellets from $UO_2$ powder, all processes other than the process of preparing the $UO_2$ powder mixtures for nuclear fuel manufacturing were performed in the same manner. The results of comparing the existing preparation method and the preparation method of the present disclosure are shown in Table 2 below.

In the existing method of preparing the $UO_2$ powder mixture for nuclear fuel manufacturing and the method of preparing the $UO_2$ powder mixture for nuclear fuel manufacturing of the present disclosure, the amount of ($UO_2$+$U_3O_8$) powder in each mixer was 50 kg, and a lubricant powder was added in an amount of 200 g (=0.4 parts by weight). Other mixing conditions are shown in Table 2 below.

In addition, to compare the physical properties of molded pellets and sintered pellets manufactured from the $UO_2$ powder mixtures prepared according to the existing preparation method and the preparation method of the present disclosure, 100 of each pellet was manufactured.

The $UO_2$ powder mixtures were pressed by filling punch and die to manufacture the molded pellets, and the manufactured molded pellets were subjected to heat treatment in a gas environment for a predetermined time to manufacture the sintered pellets.

Considering the fluidity of the powder, only the length was measured in the case of the molded pellets, and the deviation thereof was calculated. The impact on diameter was not considered because the molded pellets were manufactured using the punch and die having the same diameter. In the case of the sintered pellets, the length, diameter, and density were measured, and the respective deviations thereof were calculated.

TABLE 2

| Classification | | | Existing | Novel |
|---|---|---|---|---|
| Mixer | | | Screw mixer | IBC blender |
| Powder | Mixing condition | Mixing direction and time | Forward mixing (orbital and rotational) for 2 hours | Forward mixing for 30 minutes + backward mixing for 10 minutes |
| | | Lubricant injection method | Added three times | Added once initially |
| | | Worker | On standby | Rearranged |
| Molded pellet | Length deviation (mm) | | 9.00 ± 1.5 | 9.00 ± 1.0 |
| Sintered pellet | Length deviation (mm) | | 9.00 ± 1.3 | 9.00 ± 0.8 |
| | Diameter deviation (mm) | | 8.00 ± 0.05 | 8.00 ± 0.03 |
| | Density deviation ($g/cm^3$) (theoretical density of $UO_2$, % TD: 10.96 $g/cm^3$) | | 10.45 ± 0.20 (93.52% to 97.17% TD) | 10.45 ± 0.10 (94.43% to 96.26% TD) |
| | Mirostructure | | Partially existing coarse pores | Homogeneously distributed micropores |
| Productivity | Defect rate (%) | | 5 to 10 | 3 to 5 |

As shown in Table 2, it was confirmed that the molded pellet and sintered pellet manufactured from the $UO_2$ powder mixture for nuclear fuel manufacturing of the present disclosure were superior in properties to the molded pellet and sintered pellet manufactured from the $UO_2$ powder mixture for nuclear fuel manufactured using the screw mixer. More specifically, in the case of the molded pellet and sintered pellet manufactured from the $UO_2$ powder mixture for nuclear fuel manufacturing, the fluidity of the $UO_2$ powder mixture was good, so the length deviations of the molded pellet and the sintered pellet were small, confirming that the density deviations were also small. While the quality standard for sintered pellets is based on 95.0% to 95.7% of the theoretical density, the density deviation of the sintered pellet manufactured according to the method of the present disclosure is smaller than the density deviation of the sintered pellet manufactured according to the existing method, so quality control is easy.

In addition, in the microstructure of the sintered pellet, micropores are confirmed to be homogeneously distributed, meaning that $U_3O_8$, acting as a porogen, is evenly distributed in the $UO_2$ powder mixture. Furthermore, there were no coarse pores because the lubricant was distributed homogeneously without being clustered. On the contrary, in the case of the sintered pellet manufactured from the $UO_2$ powder mixture for nuclear fuel manufacturing manufactured using the screw mixer, it is confirmed that some coarse pores exist in the microstructure, meaning that the porogen and the lubricant added to the $UO_2$ powder mixture fail to be evenly distributed.

The method of preparing the $UO_2$ powder mixture for nuclear fuel manufacturing of the present disclosure uses the IBC blender, thereby allowing the lubricant to be added only once initially, shortening mixing time, improving the degrees of homogeneity and mixing by preventing unmixed lubricant from being generated through backward rotation, improving the fluidity of the powder, and enabling continuous work. In addition, there is no need for workers to be on standby to add the lubricant, thus being excellent in economic feasibility, efficiency, and safety.

Furthermore, the defect rate in the $UO_2$ pellet manufacturing process appeared to be 5 to 10% in the case of the existing method (defect rate in the molding process: 1 to 2%, defect rate in the grinding process: 5 to 8%), and 3 to 5% in the case of the present disclosure (defect rate in the molding process: 0%, grinding process defect rate: 3 to 5%).

Typically, pellet defects occur mainly in a molding process, in which molded pellets are manufactured by pressing a $UO_2$ powder mixture, and a grinding process, in which sintered pellets are ground. Defects in the molding process occur because the molded pellets are damaged in the process of manufacturing a molded body or because the length of the molded pellets exceeds the specification range. Defects in the grinding process result from damage to cracks, pores, or unground parts on the surface of the ground pellets. In the molding process, the defect rate was 1 to 2% in the case of the existing method while in the case of the present disclosure, the defect rate was 0%. In addition, while the defect rate in the grinding process was 5 to 8%, the defect rate in the case of the present disclosure was 3 to 5%. The defect rate was low in the grinding pellets manufactured by applying the present disclosure because there were no unground parts on the surface of the pellets, and there was no damage resulting from the pores. There are no unground parts because a decrease in molding pressure due to friction is small when molding powder particles in which the lubricant is homogeneously dispersed. In addition, while damage resulting from the pores mainly occurs when the lubricant is clustered due to a poor degree of mixing and thus remains after the sintering process, such damage occurred less in the case of the pellets manufactured by the technology of the present disclosure.

As described above, the lubricant and the porogen are evenly distributed in the $UO_2$ powder mixture for nuclear fuel manufacturing prepared using the IBC blender. As a result, the molded pellet manufactured from the $UO_2$ powder mixture, the sintered pellet, and the ground pellet are much better in the properties and quality of the pellets.

As described above, in the case of mixing using the IBC blender device of the present disclosure, the degrees of mixing and homogeneity were better than those in the case of mixing using the existing screw mixer, showing that the finally manufactured $UO_2$ pellets were excellent in properties and quality.

The invention claimed is:

1. A method of preparing a $UO_2$ powder mixture for nuclear fuel manufacturing, the method comprising:

(a) weighing and sieving a porogen and a lubricant using an automatic injection device; and injecting the porogen and lubricant together at an initial stage into a container containing $UO_2$ powder; and (b) mixing the $UO_2$ powder, the porogen, and the lubricant using a blender, wherein the mixing in the (b) comprises:

forward mixing performed under conditions in which:

a rotation speed of the blender is in a range of 10 to 14 rpm, a container filling rate of the powder is in a range of 50 to 70 vol %, and a mixing time is in a range of 20 to 30 minutes, and backward mixing performed under conditions in which:

a rotation speed of the blender is in a range of 10 to 14 rpm, and a mixing time is about 10 minutes, and wherein the $UO_2$ powder is contained in an amount of 10 to 500 kg, and 0.08 to 10 parts by weight of the porogen and 0.05 to 1 part by weight of the lubricant are contained with respect to 100 parts by weight of the UO2 powder.

2. The method of claim 1, wherein the porogen is $U_3O_8$ powder or azodicarbonamide (ADCA, $C_2H_4N_4O_2$).

3. The method of claim 1, wherein the lubricant is Acrawax (ethylene distearamide, $C_{38}H_{76}N_2O_2$) or zinc stearate ($Zn—C_{36}H_{70}O_4$).

4. The method of claim 1, wherein the automatic injection device comprises a 300-μm sieving machine and removes granules present in the porogen and the lubricant, and the porogen and the lubricant are added in a weight ratio set according to the weight of the $UO_2$ powder.

5. A method of manufacturing a $UO_2$ nuclear fuel, the method comprising:

preparing a $UO_2$ powder mixture by:

(a) weighing and sieving a porogen and a lubricant using an automatic injection device; and injecting the porogen and lubricant together at an initial stage into a container containing $UO_2$ powder; and (b) mixing the $UO_2$ powder, the porogen, and the lubricant using a blender, wherein the mixing in the (b) comprises:

forward mixing performed under conditions in which:

a rotation speed of the blender is in a range of 10 to 14 rpm, a container filling rate of the powder is in a range of 50 to 70 vol %, and a mixing time is in a range of 20 to 30 minutes, and backward mixing performed under conditions in which:

a rotation speed of the blender is in a range of 10 to 14 rpm, and a mixing time is about 10 minutes, and wherein the $UO_2$ powder is contained in an amount of 10 to 500 kg, and 0.08 to 10 parts by weight of the porogen and 0.05 to 1 part by weight of the lubricant are contained with respect to 100 parts by weight of the UO2 powder;

manufacturing a $UO_2$ molded pellet by pressing the $UO_2$ powder mixture;

manufacturing a $UO_2$ sintered pellet by sintering the $UO_2$ molded pellet; and manufacturing a $UO_2$ ground pellet by grinding the sintered pellet so that the sintered pellet maintains a uniform diameter, wherein a defect rate is 5% or less, and the sintered pellet has a density of 10.30 to 10.58 g/cm$^3$.

* * * * *